Figure 1:
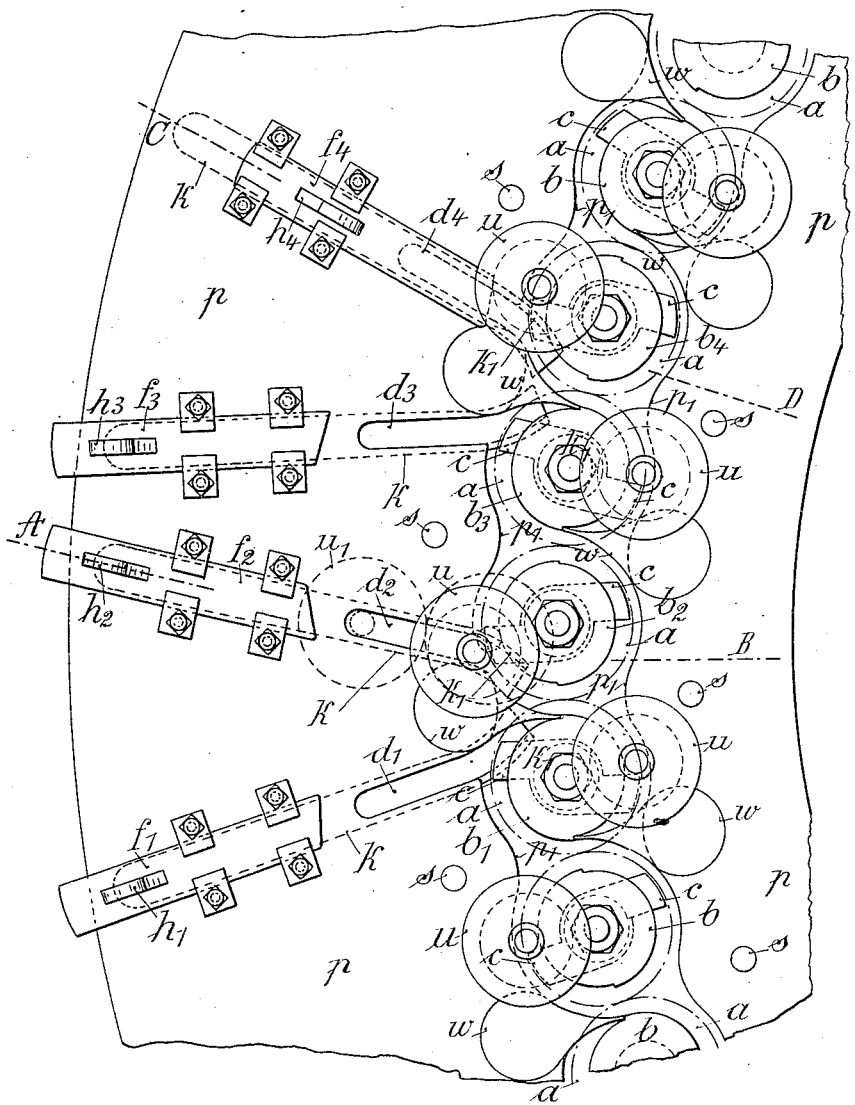

W. BISDORF.
LACE MAKING MACHINE.
APPLICATION FILED MAY 9, 1912.

1,098,217.

Patented May 26, 1914.
11 SHEETS—SHEET 1.

W. BISDORF.
LACE MAKING MACHINE.
APPLICATION FILED MAY 9, 1912.
1,098,217.
Patented May 26, 1914.
11 SHEETS—SHEET 2.
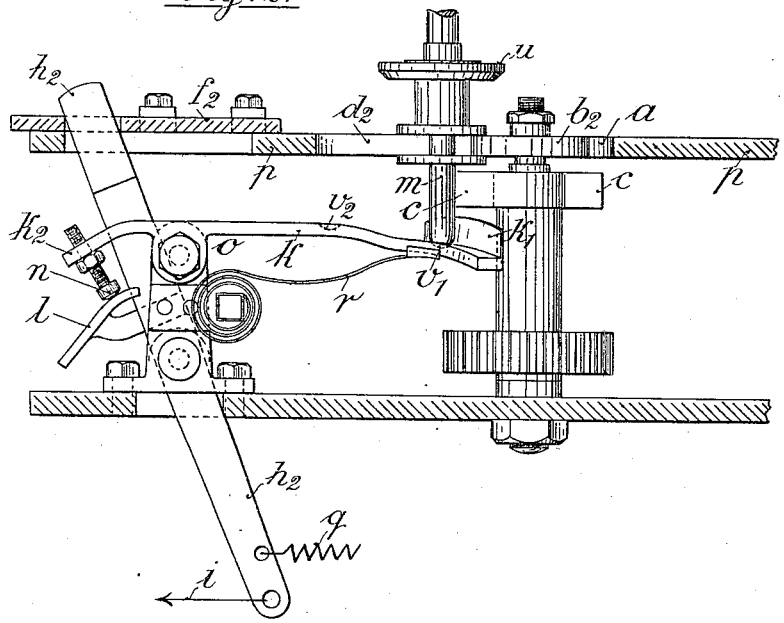
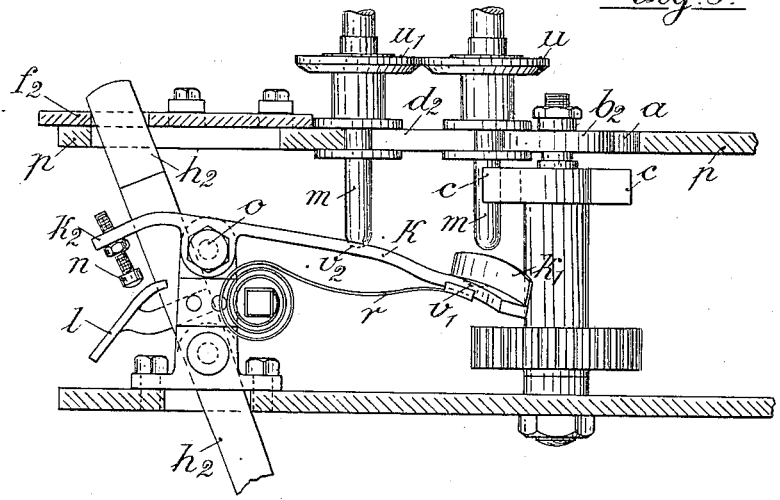
Witnesses:
Helen Nufer
Albert Nufer
Inventor:
Wilhelm Bisdorf

W. BISDORF.
LACE MAKING MACHINE.
APPLICATION FILED MAY 9, 1912.

1,098,217.

Patented May 26, 1914.
11 SHEETS—SHEET 3.

Witnesses:
Helen Nufer
Albert Nufer

Inventor:
Wilhelm Bisdorf

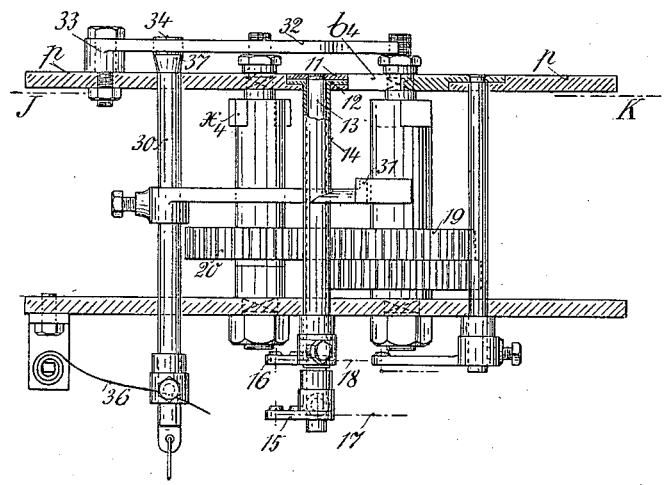
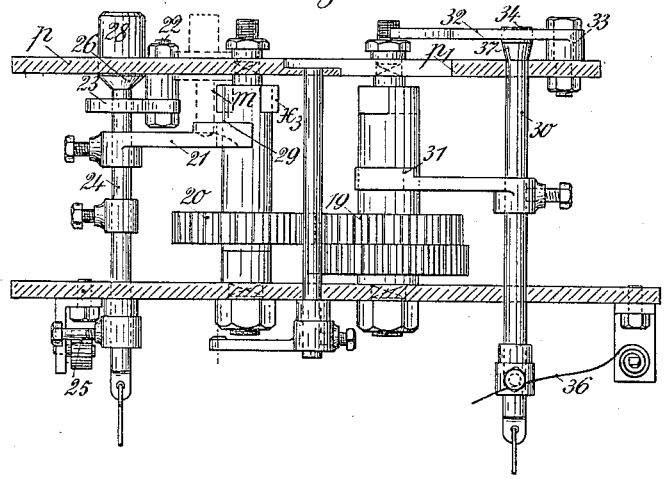

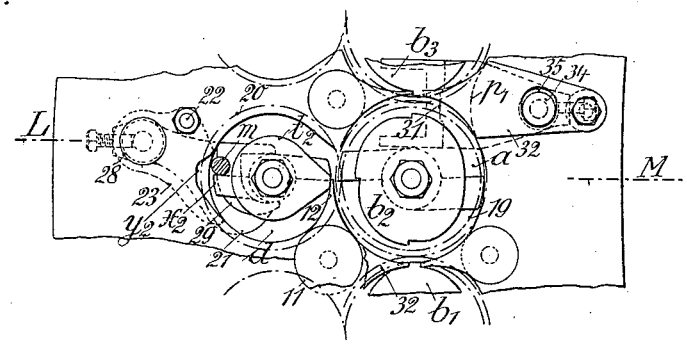

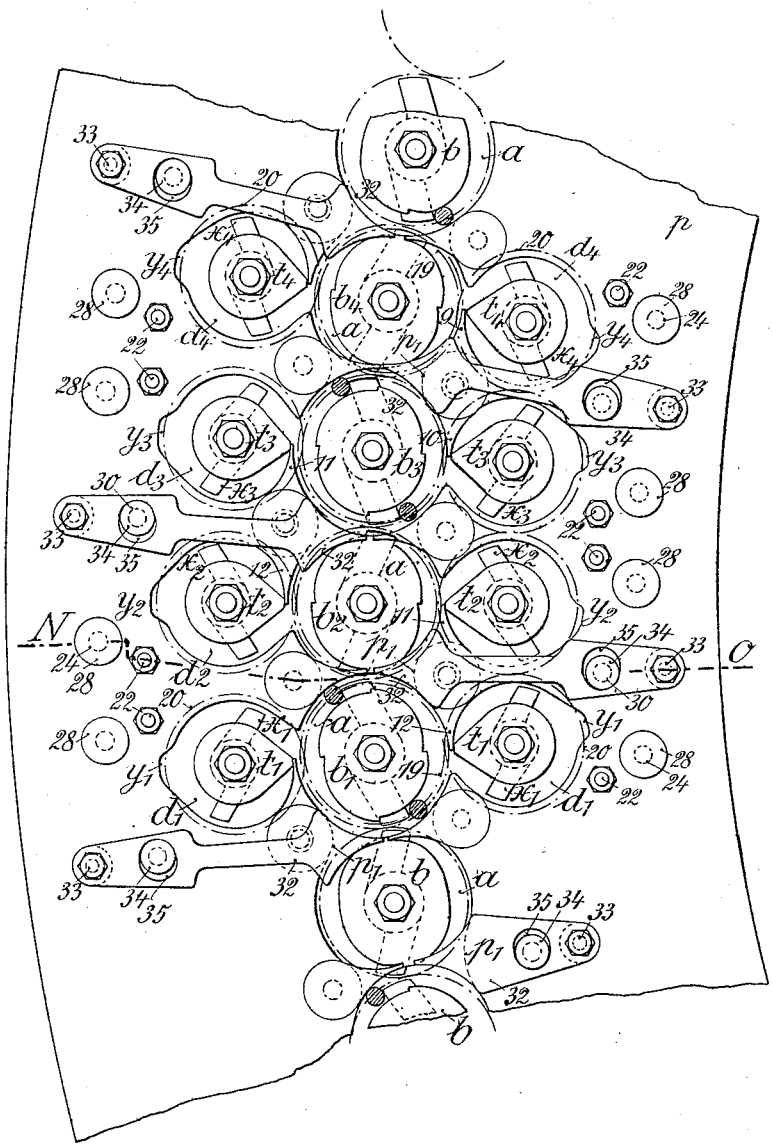

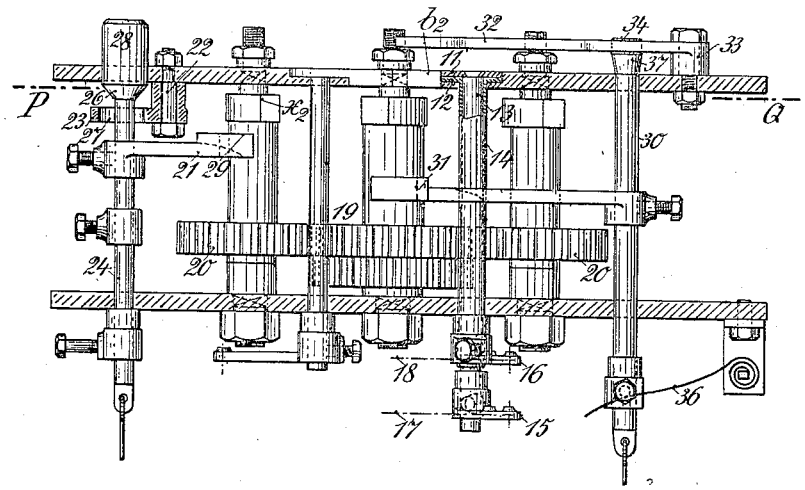

W. BISDORF.
LACE MAKING MACHINE.
APPLICATION FILED MAY 9, 1912.

1,098,217.

Patented May 26, 1914.
11 SHEETS—SHEET 10.

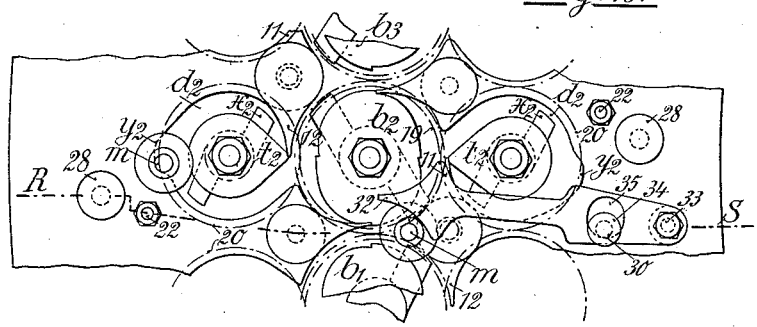
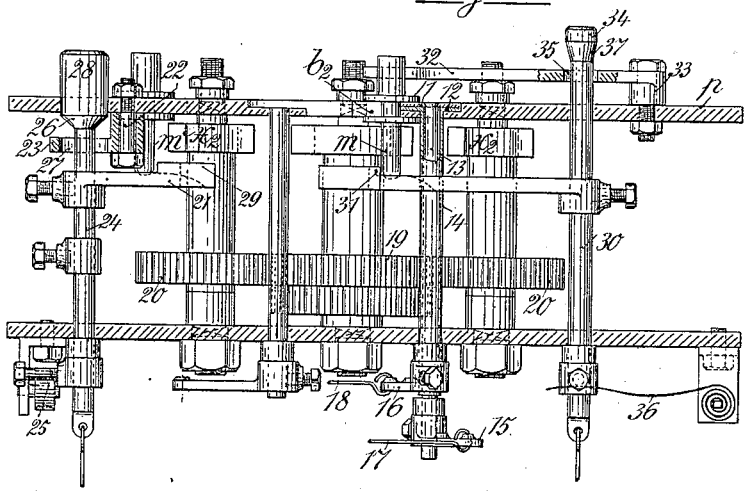

UNITED STATES PATENT OFFICE.

WILHELM BISDORF, OF BARMEN, GERMANY, ASSIGNOR TO THE FIRM OF A. W. NAGEL, OF BARMEN, GERMANY.

LACE-MAKING MACHINE.

1,098,217.      Specification of Letters Patent.      Patented May 26, 1914.

Application filed May 9, 1912. Serial No. 696,100.

*To all whom it may concern:*

Be it known that I, WILHELM BISDORF, a citizen of the Empire of Germany, and residing at Barmen, Germany, have invented certain new and useful Improvements in Lace-Making Machines, of which the following is a specification.

My invention relates to a lace-making machine, of the type wherein the number of bobbins is equal to the number of plates or disks, and a primary object of my invention is to provide a machine of this type which will make a lace containing overlaid work or spots on the groundwork of the lace, and which will effect this by employment of the bobbins normally occupying the track for the production of the groundwork.

To this end, I connect to the main track at certain adjacent disks thereon a number of side-tracks each of which is provided with a device, actuated by the pattern (jacquard) gear, for inserting and withdrawing the bobbins and for closing the particular side-track. The side-tracks may also be of circular form, and are then formed by auxiliary disks adjacent to the main track, which are provided with devices for arresting the bobbins. These side-tracks first of all receive for a certain time those bobbins which are separated from the bobbins during the normal braiding work and which are destined to produce the overlaid spot, and during this time a suitable portion of the groundwork is produced by the remaining bobbins; thereupon, the separated bobbins are brought to their corresponding disks by the pattern-gear and placed before the drivers, the side-tracks being simultaneously closed, and then the overlaid spot is produced on these disks, which during this time are kept free of the bobbins which previously produced the groundwork. The number of bobbins so temporarily separated can be as desired, and the change from withdrawal to insertion and vice versa will more or less frequently occur according to the length of overlaid spot. The side-tracks may be located either outside or inside the circle of disks, or both outside and inside the same, and may be arranged in groups at various parts of the track or, with a view to employing any desired grouping, be arranged at all the disks. When only lace without overlaid work is to be produced the side tracks are simply kept closed by means of the pattern gear.

Several illustrative embodiments of my invention are represented by way of example in the accompanying drawings, wherein:—

Figure 4:
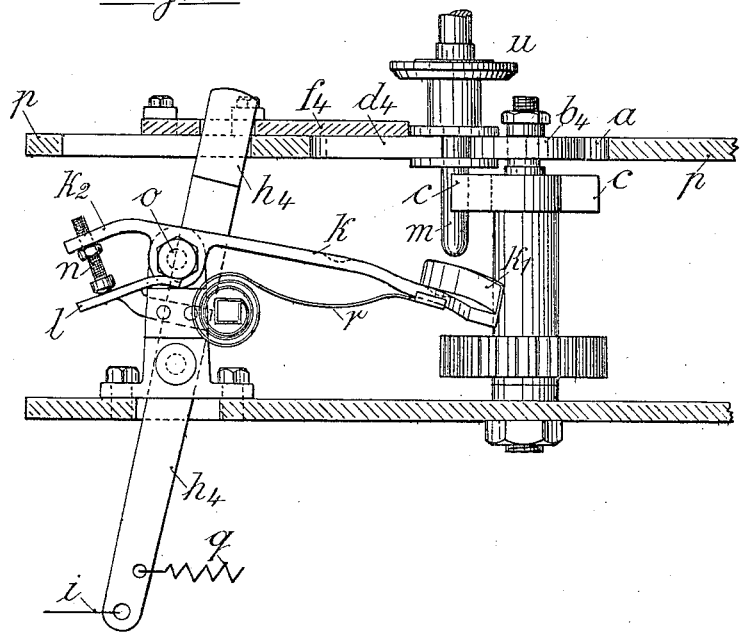
Figure 5:
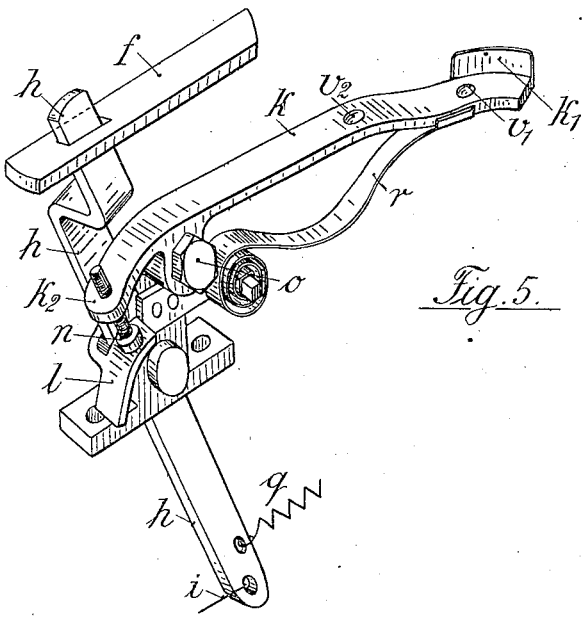
Figure 6:
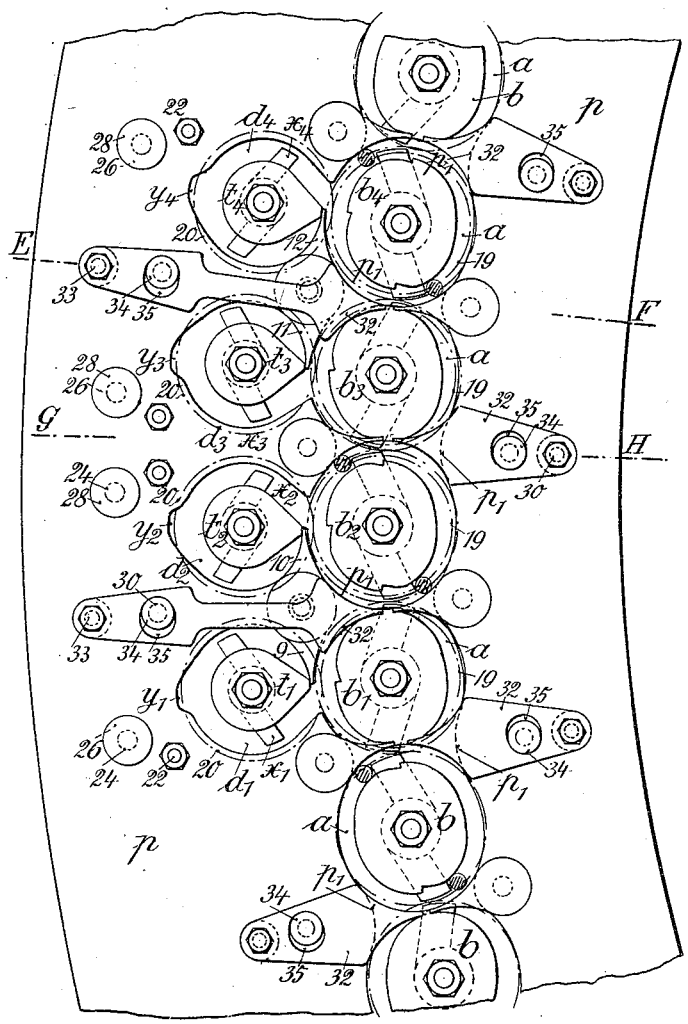
Figure 9:
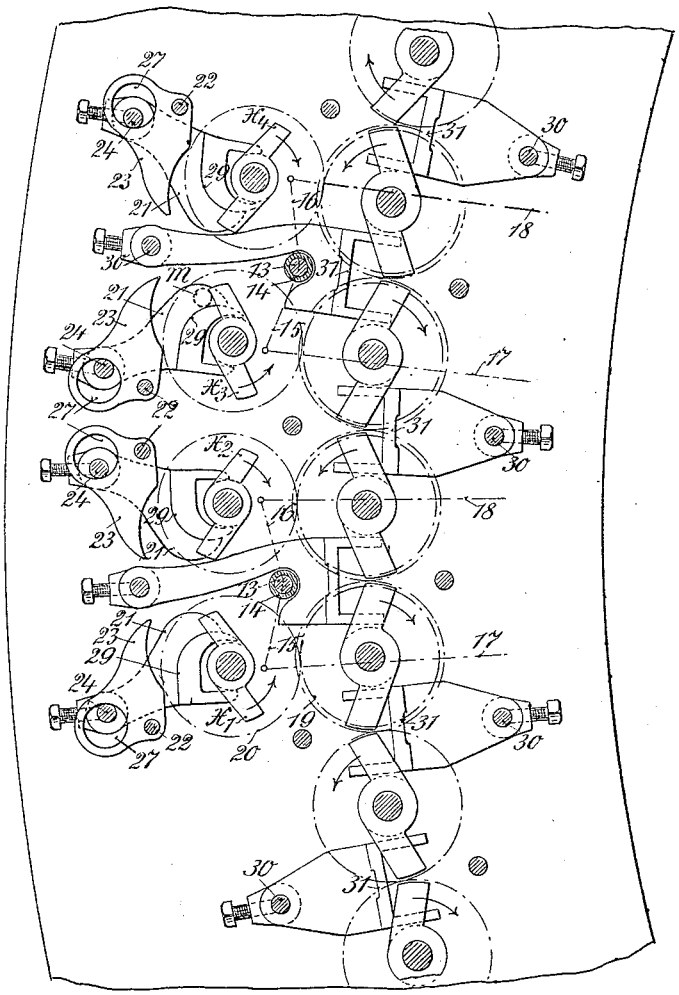
Figure 14:
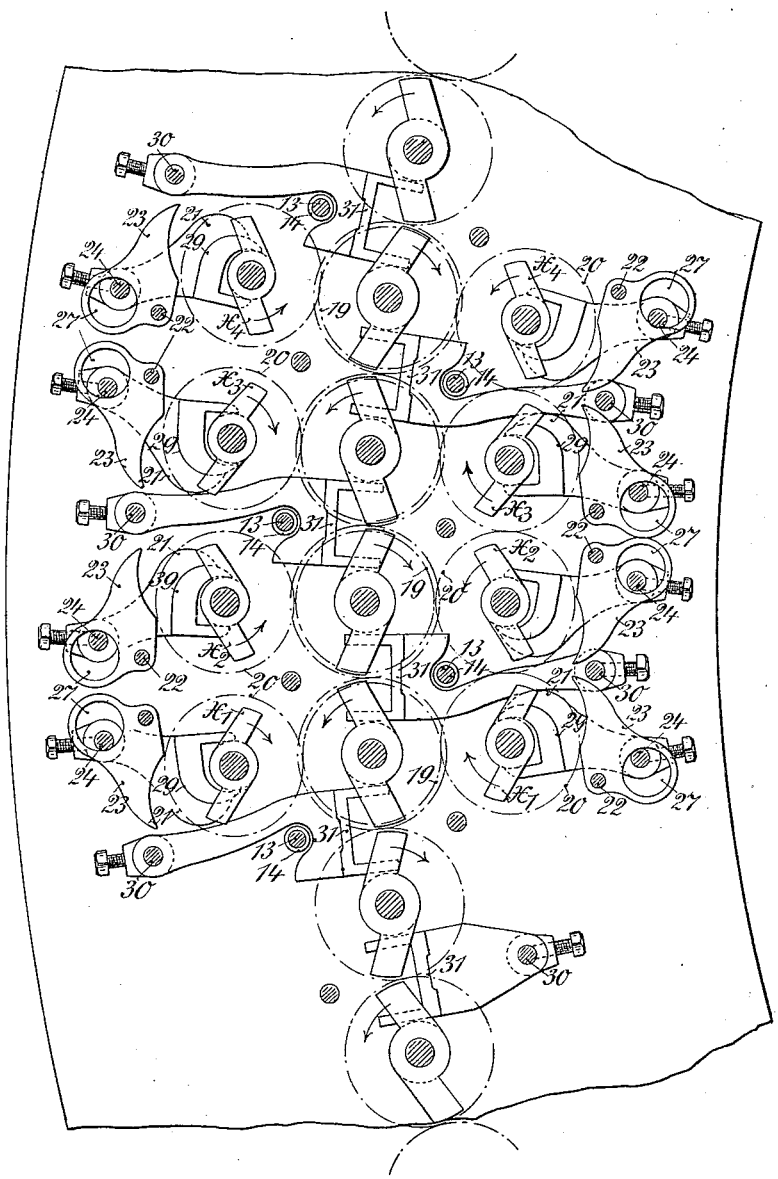

Figure 1 is a top plan view of a portion of the upper plate of a lace-making machine in which the number of bobbins is equal to the number of disks, straight side-tracks being provided, Figs. 2 and 3 are vertical sections, enlarged, taken on the line A—B in Fig. 1, showing two different positions of the bobbin-carriers, Fig. 4 is a vertical section, enlarged, taken on the line C—D in Fig. 1, showing the side-track closed, and Fig. 5 is a perspective view of the device located below each side-track; Fig. 6 is a top plan view of a portion of the top frame-plate of a lace-making machine in which the number of bobbins is equal to the number of disks, side disks being provided outside the well-known circle of disks, Figs. 7 and 8 are enlarged vertical sections taken on the lines E—F and G—H, respectively, in Fig. 6, and Fig. 9 is a horizontal section taken on the line J—K in Fig. 7; Fig. 10 is a top plan view showing a main disk and a side disk, the bobbin-carrier on the latter being about to be driven into the main track; Fig. 11 is a vertical section taken on the line L—M in Fig. 10, Fig. 12 is a top plan view of a portion of the top frame-plate of the machine comprising side disks arranged both on the outside and on the inside of the main track, Fig. 13 is a vertical section taken on the line N—O in Fig. 12, and Fig. 14 is a horizontal section taken on the line P—Q in Fig. 13; Fig. 15 is a top plan view of a main disk with side disks on both sides of it, one bobbin-carrier being arrested at the crossing in the main track and another at one of the side disks, and Fig. 16 is a vertical section taken on the line R—S in Fig. 15.

Referring firstly to Figs. 1 to 5, the main track $a$ of the machine is formed in known manner between the portions $p$, $p$ of the top frame-plate by a circle of disks $b$ under which the two-armed drivers $c$ run. The number of bobbin-carriers is equal to the number of disks or plates and the bobbin-carriers are arrested for regulating the course of the bobbins in known manner at the truncated places $p_1$ by means of a suitable arresting device operating conjointly with the switches $w$. The positions of these devices are indicated in Fig. 1 only by circles $s$.

In the illustrated example, the four side-tracks $d_1$, $d_2$, $d_3$, $d_4$ run into the main track at the four disks $b_1$, $b_2$, $b_3$, $b_4$, and when simple lace, such as is made on a machine of the type described without side-tracks, is to be made these side-tracks are kept closed by means of the slides $f_1$, $f_2$, $f_3$, $f_4$, as is shown in Fig. 1 in the case of the track $d_4$. Each of these slides $f$ (Fig. 5) is moved by one end of a lever $h$ whose other end is connected by a tie $i$ to the pattern-gear and is influenced by a spring $q$ tending to cause it to move the slide away from the side-tracks, as shown at $f_1$, $f_2$, $f_3$ in Fig. 1. Under each side-track is also arranged a bobbin-carrier guide $k$ whose free end extends to below the main track and here has at its edge a vertical projection or rim $k_1$ for stopping the pin $m$ of the bobbin-carrier when the guide $k$, journaled on the pin $o$, is in its elevated position. The guide is raised into this position by means of a spring $r$ when the lever $h$ is tilted over into its rear position by the spring $q$, and the other end $k_2$ of the guide extending behind the pin $o$ then bears on an arm $l$ fast on the lever $h$. In order to be able to adjust the guide to the correct height, it is provided at its end $k_2$ with a set-screw $n$ whose head slides on the arm $l$.

When a bobbin-carrier has been withdrawn into a side-track or turnout, as $d_2$, by means of the guide, the driver $c$ passes by the bottom $m$ of the bobbin-carrier whose somewhat rounded end has entered into a recess $v_1$ in the guide or withdrawer $k$. Each bobbin-carrier is provided at a suitable height with a collar or flange $u$ of such a size that a bobbin-carrier arriving in the above described manner at the entrance to the side-track $d_2$ is driven to the other end of the side-track into the position $u_1$ by the next normally running bobbin-carrier following it owing to their two flanges $u$ meeting, as shown in Fig. 1 in dotted lines. When the shunted bobbin-carrier is in this position, shown also in Fig. 3, the guide $k$ has in the meantime been depressed so far, owing to the end $m$ of the bobbin-carrier sliding up its inclined face, that the operating bobbin-carriers can pass freely over its rim $k_1$. The bobbin-carrier thus forced into the side-track is secured in position by its end $m$ entering into a recess $v_2$. In order that all the bobbin-carriers can freely travel along the main track when making ordinary lace, i. e. when the slides $f$ are in their forward position (Fig. 4) and close the side-tracks, the arm $l$ fast on the lever $h$ is eccentric relatively to the fulcrum of the lever, so that when the lever is rocked to push the slide forward, this arm bears against the head of the screw $n$ in the rear end $k_2$ of the guide $k$, as clearly shown in Fig. 4, and drives it upward. The front end $k_1$ of the guide $k$ is then depressed so far against the pressure of the spring $r$ that the bottom ends of the bobbin-carriers cannot now come into contact with it. Now if a spot is to be made upon a lace-groundwork by means of four bobbins on a machine of the above described arrangement comprising four side-tracks, two of the bobbin-carriers will first enter the side-tracks and afterward the other two, these four bobbin-carriers being driven to the outer ends of the side-tracks by the flanges of the bobbin-carriers which still continue to travel along the main track (Fig. 3). In this position of the bobbin-carriers the threads leading to the braiding place are in a position such that the threads of the running bobbins go under them. The four disks $b_1$, $b_2$, $b_3$, $b_4$ are now for a short time kept clear of the through or track bobbins, i. e. those producing the groundwork, and the bobbin-carriers in the side-tracks are brought by the slides to these disks in front of their drivers, whereupon these bobbins are so driven on these four disks that they produce a corresponding portion of the overlaid spot. The production of the spot is effected by a known method of braiding, three of the threads being used as warp-threads, and the fourth being braided therewith as a weft-thread. Thereupon the four bobbins are again guided into the side-tracks, and, owing to the other bobbins now running over the four disks just vacated, a piece of the groundwork in single-thread braiding is produced. After that the same series of operations is repeated for producing a further piece of the overlaid spot, then, on the four bobbins being again guided into the side-tracks, another piece of the ground-work is braided, and so on until the required length of spot has been produced. When the side-tracks are to remain closed, the slides are kept in the position shown in Fig. 4 by means of the pattern-gear, and the machine then operates in known manner as required for making lace.

Various defects are attached to the straight side-tracks with their devices for withdrawing and returning the bobbins and for keeping them closed. Firstly, both the pushing of the bobbin-carriers into the side-tracks and the ejection therefrom cause an undesirable jerky operation of the machine, so that a certain speed of the machine cannot be exceeded. Furthermore, the jacquard pattern-gear is subjected to serious strain when driving forward the bobbins. In addition, the devices for withdrawing and returning the bobbin-carriers cause complicated connections with the jacquard pattern-gear, partly in order to arrange the draw-rods suitably, and partly in order to obtain the necessary stroke for thrusting forward the bobbins. These defects are entirely obviated in the following manner. Instead of the straight side-tracks I arrange circular side-tracks or turnouts in connection with the main track of the machine, the same being formed by side disks provided with switches, and each being provided with a device for arresting the bobbin-carriers and for returning them into action. The machine can then run at a greater speed, it operates quietly and entirely free from shocks, also with more certainty and smoothness, and it needs considerably less power to drive it chiefly owing to the reduced load on the jacquard pattern-gear. The flanges on the bobbin-carriers for inserting the bobbin-carriers into the side-tracks are not now required; and the ties connected with the jacquard pattern-gear can be suitably arranged below the machine so as to be both readily seen and readily accessible.

If overlaid work is to be made with four bobbins as in the machine illustrated in Figs. 1 to 5, the four disks $b_1$, $b_2$, $b_3$, $b_4$ are provided with side tracks $d_1$, $d_2$, $d_3$, $d_4$, but these are formed by the side disks $t_1$, $t_2$, $t_3$, $t_4$, each of which is connected to the main track $a$ by a switch 9, 10, 11, 12, respectively. Of these switches each two, i. e. 9, 10 and 11, 12, have a common center of rotation, one of the switches being fast on an axle 13 and the other on a sleeve 14 surrounding this axle (Figs. 7 and 9). For adjusting the switches, a lever 15 is mounted on the axle 13, and a lever 16 on the sleeve 14, these levers being connected to the jacquard pattern-gear by the ties 17 and 18 respectively. The bobbin-carrier drivers $x_1$, $x_2$, $x_3$, $x_4$, belonging to the side disks are rotated by the disks in the main track through the medium of gear wheels 19, 20; when the switches 9, 10 are suitably placed the bobbin-carriers are guided onto the side disks, and in order to arrest them thereon the side-tracks $d_1$, $d_2$, $d_3$, $d_4$ are provided with recesses $y_1$, $y_2$, $y_3$, $y_4$, at each of which are arranged a bobbin-carrier guide 21 and a bobbin-carrier pusher 23 rotatable about the axle 22 (Figs. 8 and 9). This arresting device does not constitute a part of the subject-matter of my invention. The bobbin-carrier guide 21 is fast on a pin 24 which is displaceable vertically in the upper and lower frame-plates of the machine, and, after being drawn down by the jacquard pattern-gear, is always returned into its highest position by a spring 25. At the top of this pin is a conical shoulder 26 running out into a head 28 which goes through a correspondingly large hole 27 in the pusher 23. When the guide 21 is in its upper position (Fig. 8) and when a bobbin-carrier on the side disk arrives with its pin $m$ at the rim 29 of the guide, as shown in dotted lines in Figs. 8 and 9, this bobbin-carrier is driven by the driver into the recess in the side-track, the bobbin-carrier pusher being pushed back into the position shown in Fig. 9. The cone 26 is then eccentrically above the hole 27 in the pusher 23, so that the bobbin-carrier $m$ is returned from the recess into the side-track when the cone is drawn down by the jacquard pattern-gear (Figs. 10 and 11) and the pusher 23 is consequently turned slightly. As the head 28 then enters snugly into the hole 27, the pusher is held in the position shown in Fig. 10 and the recess closed, so that the driver now coacts with the bobbin-carrier and drives it from the side disk into the main track $a$.

When the side disks are also arranged inside the circle of disks forming the main track (Figs. 12 to 16), double switches 9, 10 and 11, 12 are provided here also, and each side disk has the same device for arresting the bobbin-carriers and returning them into the main track as described above with reference to the outside arrangement of side disks. In the drawings the parts of the devices for the inside side disks have the same reference characters as the corresponding parts at the outer side disks.

The arresting devices for temporarily stopping the bobbin-carriers at the truncated places $p_1$ in the main track likewise do not constitute part of the subject-matter of my invention; they may be substituted by other suitable devices serving the same purpose. In the example shown each of these devices comprises the guide 31, fast on the pin 30, and a switch 32 which is mounted on the top frame-plate $p$ of the machine, can be adjusted by means of the pin 30 and extends to the crossing in the track. At those places where the side disks are arranged contiguous to the circle of disks forming the main track, the pivots 33 of the switches are placed sufficiently far outwardly or inwardly for the pins 30 to be located to the rear of the side disks.

The bobbin-carriers travel around the disks forming the main track when the switches 32 are in the positions shown in Figs. 6 and 12, in which they are held by the pins 30, drawn down by the jacquard pattern-gear, the head 34 of each pin entering into the hole 35 in its appertaining switch (Figs. 6, 7, 8, 12 and 13). When, however, owing to the jacquard pattern-gear, the spring 36 forces the guide 31 into its upper position, as is illustrated in Figs. 15 and 16 for the case in which side disks are on each side of the circle of disks, the bobbin-carrier is then arrested between the guide and the truncated part of the frame-plate, and the switch 32 is correspondingly displaced sidewise, as seen in Fig. 15. The switch is held in this position, the side of the hole 35 bearing against the pin 30. A downward movement of the pin causes the conical shoulder 37 to rock the switch 32 a short distance into the positions shown in Fig. 6 or 12, and simultaneously to reinsert the bobbin into the track formed by the circle of disks.

The process of manufacturing overlaid work is carried into practice with the last described machine comprising circular side-tracks or turnouts in the same manner as in the machine having rectilinear side-tracks, a certain number of bobbins which produce the groundwork on the track-disks of the machine being temporarily guided onto the side disks, when the ground-work is made by the remaining bobbins, whereupon the bobbins are returned from the side disks to the circle of disks for making overlaid work, and so on, ground-work and spot or overlaid work being alternately manufactured.

I claim:—

1. In a lace-making machine of the character described in which the number of bobbins is equal to the number of disks or plates, and in which the bobbin-carriers are adapted to be arrested at the crossings between the disks or plates, the combination of a top frame-plate, a circle of disks forming a main track therewith, a plurality of bobbin-carriers movable in the main track, each disk having a driver for coacting with the bobbin-carriers, said frame-plate having a number of side-tracks or turnouts opening into the main track at a like number of consecutive disks, and means adapted to be actuated by pattern-gear for guiding bobbin-carriers from the main track into the side-tracks or turnouts, for returning the bobbin-carriers from the side-tracks or turnouts into the main track and for closing the side-tracks or turnouts, for the purpose specified.

2. In a lace-making machine of the character described in which the number of bobbins is equal to the number of disks or plates, and in which the bobbin-carriers are adapted to be arrested at the crossings between the disks or plates, the combination of a top frame-plate, a circle of disks forming a main track therewith, a plurality of bobbin-carriers movable in the main track, each disk having a driver for coacting with the bobbin-carriers, a plurality of side disks, each having a driver, forming with the said frame-plate a number of circular side-tracks or turnouts opening into the main track at a like number of consecutive disks forming the main track, and means adapted to be actuated by pattern-gear for guiding bobbin-carriers from the main track into the side-tracks or turnouts, for returning the bobbin-carriers from the side-tracks or turnouts into the main track and for closing the side-tracks or turnouts, for the purpose specified.

3. In a lace-making machine of the character described in which the number of bobbins is equal to the number of disks or plates, and in which the bobbin-carriers are adapted to be arrested at the crossings between the disks or plates, the combination of a top frame-plate, a circle of disks forming a main track therewith, a plurality of bobbin-carriers movable in the main track, each disk having a driver for coacting with the bobbin-carriers, a plurality of side disks, each having a driver, forming with the said frame-plate a number of circular side-tracks or turnouts opening into the main track at a like number of consecutive disks forming the main track, a switch at each side disk for guiding bobbin-carriers from the main track into the side-tracks or turnouts, each side-track or turnout having a recess for receiving a bobbin-carrier, and a device, controlled by pattern-gear, at each side disk for guiding a bobbin-carrier out of the side track or turnout into, and arresting the same in, the contiguous recess, and for returning the same into the side track or turnout, for the purpose specified.

In testimony whereof, I affix my signature in the presence of two witnesses.

WILHELM BISDORF. [L. S.]

Witnesses:
HELEN NUFER,
ALBERT NUFER.